United States Patent Office 2,856,429
Patented Oct. 14, 1958

---

2,856,429

PROCESS FOR THE PREPARATION OF NITRAMINES

Charles W. Sauer, Cambridge, Mass., assignor to Arthur D. Little, Inc., Cambridge, Mass., a corporation of Massachusetts No Drawing. Application December 24, 1953
Serial No. 400,375

8 Claims. (Cl. 260—583)

This invention relates to a new process for the preparation of nitramines and more particularly to the preparation of methylenedinitramine.

Nitramines have found increasing use in high explosives, for the —$NNO_2$ group has been shown to make a large contribution to the power of a high explosive.

Nitramines of the general formula $$R-\underset{|}{\overset{H}{N}}-NO_2$$

have generally been prepared by the nitration of N-substituted urea derivatives or carbamates, or acetamides with subsequent hydrolysis to nitramines. Frequently, the hydrolysis was accomplished only with difficulty and it was often necessary to isolate the final nitramine by way of a metal-organic salt.

As illustrative of the difficulties in nitramine production, it may be noted that previous to this invention, two methods have been used for the preparation of methylenedinitramine. These two methods followed the usual procedure in that it was necessary to isolate salts in the processes. Neither of these methods give satisfactory yields.

The first of these previous methods for making methylenedinitramine is the hydrolysis of 1,3-dinitro-1,3,5-triazacyclohexane 5-nitrate, which in turn is prepared by the nitration of hexamethylenetetramine dinitrate. Titration of this compound with barium hydroxide gives the barium salt of methylenedinitramine from which the free nitramine is obtained by acidification. (It is important to distinguish this compound from methylenedi(nitrosohydroxylamine),

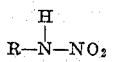

which is unstable in the free state.) The yields from this previous method of preparing methylenedinitramine are not generally more than 25%.

The second previous method for preparing methylenedinitramine is from methylenediacetamide which is nitrated by anhydrous nitric acid in acetic anhydride to give methylenedi(nitroacetamide) which in turn is hydrolyzed in the presence of barium hydroxide or ammonium hydroxide, to give the salt of methylenedinitramine. The salt is then acidified with hydrochloric acid and the methylenedinitramine extracted in ether. This procedure gives a yield of about 25% of methylenedinitramine based on the original methylenediacetamide. A description of this procedure may be found in J. Chem. Soc. 1949, 1635.

It is an object of this invention to produce nitramines in yields approaching quantitative. Another object is to produce a stable form of nitramines by means of a simple system of reactions which avoids the intermediate formation of metallic salts.

These and other objects are accomplished by the procedure of the present invention which is described in detail below.

The process of this invention involves the nitration of an n-monosubstituted formamide having the general formula of R-NHCHO in the presence of acetic anhydride or trifluoracetic anhydride and the subsequent hydrolysis of the nitroformamide derivative to the nitramine.

An improved method for the production of the intermediate methylene-bis-amides required in the process for making methylenedinitramine is described in my copending application Serial No. 199,720, filed December 7, 1950, now U. S. Patent 2,713,594, on Preparation of Methylene Bis-Amides. The process covered by this invention will therefore be described beginning with such intermediates.

The formamides suitable for this procedure include those with the general formula R-NHCHO where R is aliphatic ($C_nH_{2n+1}$), aromatic, or amide-substituted aliphatic ($C_nH_{2n}$NHCHO). The term aromatic as used herein is defined as a derivative of benzene or a carbon compound whose molecule contains one or more carbon-containing rings.

With specific reference to the production of methylenedinitramine, the N-monosubstituted formamide, suspended in acetic anhydride, is nitrated by anhydrous nitric acid to produce the nitroformamide. This nitroformamide is then hydrolyzed to give the nitramine. The reactions involved may be generally represented as follows:

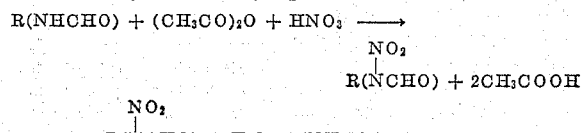

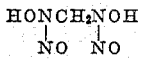

Trifluoroacetic anhydride may be used as a nitration medium in place of acetic anhydride. The consequent reaction may be generally represented as follows:

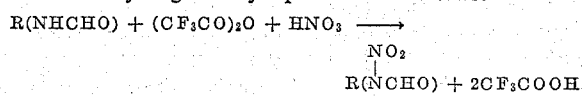

Although absolute nitric acid is preferred for nitrating, acid of 98 to 100% purity may be used. Below 98% purity, the nitric acid gives low yields. When using acetic anhydride and nitric acid, an excess of each is required. When using trifluoroacetic anhydride, the excess of anhydride and nitric acid required is less than when using acetic anhydride; in fact, equimolecular amounts can be used.

Again in the illustrative case of methylenediformamide, the molecular ratio of nitric acid to acetic anhydride to substituted formamide may be varied from about 5:3:1 to about 9:4:1 with all possible combinations within these limits. This is equivalent to a ratio range of 2.5:1.5:1 to 4.5:2:1 per formamide group. The larger ratios of acid and anhydride are preferred since decreasing the amounts of these reactants materially lowers the yield.

When trifluoroacetic anhydride is used in place of acetic anhydride, the range of nitric acid to trifluoroacetic anhydride to substituted formamide group may vary from about 1:1:1 to about 2:2:1, while 1.5:1.5:1 is preferred.

Aging time for the nitration reaction may be from 15 minutes to about ten hours. However, since in the case of methylenediformamide, a nearly quantitative yield is obtained with a 2- to 4-hour aging period, depending upon the temperature, this range is preferred. Shorter aging periods give lower yields while longer periods offer little or no material advantages.

Nitration temperatures may range from 0° to 30° C. and aging temperatures also from 0° to 30°. The nitration reaction is somewhat exothermic and it may be necessary to cool the reaction vessel. Increasing the nitration and aging temperatures decreases the time required for the reaction to go to completion. No decrease in yield has been noted at the higher temperatures or when a nitration was aged longer than the time necessary for a maximum yield. However, the product obtained at the higher temperatures may be more highly colored and may contain small amounts of tetranitromethane. The most desirable nitration and aging temperature range has therefore been set for practical operations at 0° to 10° C. with the preferred aging temperature being 10° C.

After completion of the aging period, the nitration mixture is drowned in a suitable medium to cause precipation of the nitroformamide derivative which has been formed. This precipitating medium is precooled by a suitable means such as refrigeration, auxiliary cooling, or admixture with ice to a temperature range from −30° to +5° C. and maintained at this temperature during the drowning step. Suitable drowning media include water, diethyl ether and any other liquid which will cause the precipitation of the nitroformamide derivative while dissolving the other ingredients from the nitration mixture and which also have the proper physical properties for use at this temperature range. The preferable cooling temperature range is from −20° C. to 0° C., and it may be attained by pouring the nitration mixture over finely chopped ice containing a small amount of water.

Although the hydrolysis in this process could be obtained with a base, it was found unnecessary to isolate the material in this manner. An indication of the ease of this hydrolysis is the fact that it, like the nitration reaction, is exothermic. The hydrolysis step may be carried out in various media includnig water. It is best done in an aqueous acid solution which does not decompose or adversely affect the stability of the nitramines and which has a pH ranging from about 0.1 to about 2. Hyrolysis is preferably accomplished at a pH near 2. Suitable hydrolysis media include aqueous solutions of hydrochloric phosphoric, formic and glacial acetic acids. Because of the known adverse effects of sulfuric and sulfonic acids on nitramines, these acids, of course, are not suitable for use in hydrolysis media.

Although any of these media may be used for hydrolysis, the process in the case of methylenedinitramine is best accomplished by allowing the moist nitroformamide derivative, after separation from the drowning mother liquor, to stand at room temperature alone or with a small amount of 90% formic acid. The hydrolysis takes place with the evolution of heat, the temperature rising rapidly to about 40° C. by the time the reaction has gone to completion.

The resulting nitramine may be isolated by an ordinary drying process, or xylene azeotropic distillation at about 15–20 mm. may be used to remove the water and formic acid from the hydrolysis mixture.

Recrystallization of the product may be done in any of the common organic solvent including 2-nitropropane, ethylene dichloride, isopropanol, isobutanol, ethyl acetate, carbon tetrachloride, chloroform, etc.

The following examples, which are to be considered as illustrative rather than limiting, will serve to explain the present invention in more detail.

*Example I*

Nine moles (380 ml.) of absolute nitric acid was added as rapidly as possible at ±2° C. (Dry Ice-kerosene cooling) to a well stirred suspension of 102 grams (1 mole) of methylenediformamide in 380 ml. (4 moles) of acetic anhydride. Upon completion of the nitric acid addition, the Dry Ice-kerosene bath was removed and replaced by an ice bath, and the mixture allowed to age with ice cooling for four hours. After application of the ice bath, the temperature of the reaction mixture rose to 8° C. for ¼ to ½ hour and then fell to +2° where it remained during the aging period. At the end of the aging period, the reaction mixture was poured slowly with stirring into a mixture of one liter of water and 1000 to 1500 grams of cracked ice. The precipitate of methylenedi(nitroformamide) was immediately collected on a filter and washed with three 100-ml. portions of ice water. The filter cake was pressed dry by use of a rubber dam. The yield at this point was 190 to 220 grams of damp material. Methylenedi(nitroformamide) was stirred into 100 ml. of formic acid and the resulting paste allowed to stand overnight. The following day the mixture was warmed to 65° to dissolve the methylenedinitramine which had crystallized, filtered, cooled to ice temperature and seeded to cause crystallization. After allowing sufficient time for crystallization (five to six hours), the crystals were collected on a filter and washed with benzene. The yield at this point was 70 to 80 grams of pure methylenedinitramine or 50–60% based on the amount of methylenediformamide used. To obtain a second crop of methylenedinitramine, the formic acid mother liquor was concentrated to half volume at reduced pressure, cooled to ice temperature and seeded to cause crystallization. The final yield of methylenedinitramine was 75–85% of theoretical based on the amount of methylenediformamide used.

For further purification, the methylenedinitramine may be recrystallized from a 9/1 by volume mixture of ethylene chloride and isopropanol, 2-nitropropane or 95% acetic acid. The purified methylenedinitramine melts at 105 to 106° C. and begins to decompose with evolution of gas at 110° C.

*Example II*

To a solution of 15.03 g. (0.254 mole) of N-methylformamide in 96.5 ml. (1.02 moles) of acetic anhydride cooled to ±2° C. in a kerosene-Dry Ice bath, was added 96.5 ml. (2.286 moles) of 99% nitric acid dropwise with stirring. After the addition was completed (20 minutes were necessary), the Dry Ice bath was replaced by an ice bath. The temperature of the solution was kept between 0° and +2° for 3¾ hours. The acid solution was poured into a mixture of 250 ml. of water and 380 g. ice with stirring over a five-minute period. The resulting aqueous solution was neutralized (pH≅6) with 229.3 g. (2.16 moles) of $Na_2CO_3$. The neutral solution was continuously extracted with ether for eight hours, the ether solution was dried over sodium sulfate and then evaporated by vacuum. The yellow residual liquid was redissolved in ether and the solution poured into 200 ml. of Skellysolve B at −20° C. with stirring. A white solid precipitated and was collected on a filter. Long colorless needles, M. P. 38.5–40.5°, were obtained by recrystallization from an ether-Skellysolve A mixture with Dry Ice cooling.

*Example III*

To 1 mole acetic anhydride (102 g.) was added 0.1 mole ethylenediformamide (11.6 g.). The mixture was cooled to 0° C. and 0.5 mole anhydrous $HNO_3$ (31.5 g., 21.3 ml.) was added at such a rate to keep the temperature less than 0° C. During the addition a solid was precipitated. The mixture was stirred for one hour at 30° C. and the solid dissolved. The mixture was poured into ice and the nitroformamide was collected on a filter and dissolved in 5 ml. of 1–1 HCl. The acid solution was evaporated to dryness and the residue recrystallized from hot water to give colorless crystals, M. P. 171–173° C. Mixture melting point with an authentic sample of ethylenedinitramine was 170–173° C.

*Example IV*

A solution of 20 (0.16 mole) of formanilide and 50 ml. (0.5 mole) of acetic anhydride was cooled to 0° with Dry Ice-kerosene cooling and 11 g. (0.17 mole) of anhydrous $HNO_3$ was added over a period of 12 minutes keeping the reaction temperature below 0° C. The mixture was stirred for one hour at 0–5° C. during which time the product precipitated. The solid was collected on a filter, washed with iced water and vacuum dried over potassium hydroxide. Recrystallization from ethylene chloride gave 22 g. of a pale tan solid, M. P. 106–107°

C., representing an 82.5% yield. Hydrolysis in aqueous formic acid gave phenylnitramine, M. P. 45–46° C.

*Example V*

To an ice cooled mixture of 13 ml. (0.3 mole) of absolute nitric acid and 21.0 g. (0.3 mole) of trifluoroacetic anhydride was added 10.2 g. (0.1 mole) of methylenediformamide in portions keeping the temperature at 0 to 2° C. Upon completion of the addition of methylenediformamide, the mixture was allowed to warm to 10° during one hour and then poured slowly with stirring into a mixture of 100 ml. of water and 150 g. of crushed ice. The precipitate of methylenedinitroformamide was immediately collected on a filter and washed with three 10 ml. portions of ice water. The yield of nitroformamide was quantitative. The methylenedi(nitroformamide) was hydrolyzed and methylenedinitramine isolated from the hydrolysis solution in the same manner as in Example I.

I claim:

1. A process for producing nitramines comprising the steps of nitrating an N-monosubstituted formamide in the presence of a nitration medium, drawning the nitration mixture in a suitable precipitating medium at a temperature ranging between −30° C. and +5° C., hydrolyzing the intermediate nitroformamide formed, and isolating the nitramine thus formed, said N-monosubstituted formamide having the general formula R—NHCHO where R is a member of the group consisting of lower alkyl, phenyl, and amide-substituted lower alkyl radicals, said nitration medium being taken from the group consisting of acetic anhydride and trifluoracetic acid, said precipitating medium being a liquid which will precipitate the said intermediate nitroformamide and dissolve the other ingredients from the nitration mixture, said hydrolyzing step being accomplished in an aqueous acid solution having a pH ranging from 0.1 to about 2 and being substantially non-reactive with nitramine formed.

2. A process for producing nitramines comprising the steps of nitrating an N-monosubstituted formamide in the presence of a nitration medium, drowning the nitration mixture in a suitable precipitating medium at a temperature ranging between −30° C. and +5° C., hydrolyzing the intermediate nitroformamide formed, and isolating the nitramine thus formed, said N-monosubstituted formamide having the general formula R—NHCHO where R is a member of the group consisting of lower alkyl, phenyl, and amide-substituted lower alkyl radicals, said nitrating step being accomplished at a temperature between about 0° C. and about 30° C. with 98–100% nitric acid for an aging period of about 2 to 4 hours, said nitration medium being taken from the group consisting of acetic anhydride and trifluoracetic acid, said precipitating medium being a liquid which will precipitate the said intermediate nitroformamide and dissolve the other ingredients from the nitration mixture, said hydrolyzing step being accomplished in an aqueous acid solution having a pH ranging from 0.1 to about 2 and being substantially non-reactive with the nitramine formed.

3. The process in accordance with claim 2 wherein the nitration medium is acetic anhydride and the molecular ratio of nitric acid to acetic anhydride to substituted formamide group is from about 2.5:1.5:1 to about 4.5:2:1.

4. The process in accordance with claim 2 wherein the nitration medium is trifluoroacetic anhydride and the molecular ratio of nitric acid to trifluoroacetic anhydride to substituted formamide group is from about 1:1:1 to about 2:2:1.

5. A process for producing nitramines comprising the steps of nitrating an N-monosubstituted formamide in the presence of a nitration medium, drowning the nitration mixture in a suitable precipitating medium at a temperature ranging between −30° C. and +5° C., hydrolyzing the intermediate nitroformamide formed, and isolating the nitramine thus formed, said N-monosubstituted formamide having the general formula R—NHCHO where R is a member of the group consisting of lower alkyl, phenyl, and amide-substituted lower alkyl radicals, said nitrating step being accomplished at a temperature between about 0° C. and about 30° C. with 98 to 100% nitric acid for an aging period of about 2 to 4 hours, said nitration medium being taken from the group consisting of acetic anhydride and trifluoracetic acid, said precipitating medium being liquid which will precipitate the said intermediate nitroformamide and dissolve the other ingredients from the nitration mixture, and said hydrolyzing step being accomplished in the presence of an aqueous acid solution, said aqueous acid solution having a pH ranging from about 0.1 to about 2 and being one which does not decompose or adversely affect the stability of said nitramine.

6. The process in accordance with claim 5 wherein the hydrolyzing step is accomplished in an aqueous solution of formic acid.

7. A process for the production of methylenedinitramine which comprises the steps of nitrating methylenediformamide with an excess of absolute nitric acid in the presence of trifluoroacetic anhydride, drowning the resulting reaction mixture in an ice-water mixture to precipitate the methylenedi(nitroformamide) thus formed, collecting and washing said methylenedi(nitroformamide), hydrolyzing said methylendi(nitroformamide) in the presence of 90% formic acid, and isolating the chrystals of methylenedinitramine formed, said nitrating step being carried out at about 2° C. to 8° C. for about 1 to 4 hours, said absolute nitric acid, trifluoroacetic anhydride and methylenediformamide being present in the starting reaction in the molecular ratio of about 3:3:1.

8. A process for the production of methylenedinitramine which comprises the steps of nitrating methylenediformamide with an excess of absolute nitric acid in the presence of acetic anhydride, drowning the resulting reaction mixture in an ice-water mixture to precipitate the methylenedi(nitroformamide) thus formed, collecting and washing said methylenedi(nitroformamide), hydrolyzing said methylenedi(nitroformamide) in the presence of 90% formic acid, and isolating the crystals of methylenedinitramine formed, said nitrating step being carried out at about 2° C. to 8° C. for about 2 to 4 hours, said absolute nitric acid, acetic anhydride and methylenediformamide being present in the starting reaction in the molecular ratio of about 5:3:1 to 9:4:1.

References Cited in the file of this patent

Chapman et al.: Jour. Chem. Soc. (1949), pp. 1631–58.